US012795783B2

(12) United States Patent
Miyairi et al.

(10) Patent No.: US 12,795,783 B2
(45) Date of Patent: Nov. 10, 2026

(54) HEATER AND HEATING MEMBER

(71) Applicant: NGK Insulators, Ltd., Nagoya-City (JP)

(72) Inventors: Yukio Miyairi, Nagoya-City (JP); Masaaki Masuda, Nagoya-City (JP); Koji Kuzutani, Konan-City (JP); Shinzou Hayashi, Nagoya-City (JP)

(73) Assignee: NGK INSULATORS, LTD., Nagoya (JP)

(*) Notice: Subject to any disclaimer, the term of this patent is extended or adjusted under 35 U.S.C. 154(b) by 1029 days.

(21) Appl. No.: 18/056,326

(22) Filed: Nov. 17, 2022

(65) Prior Publication Data

US 2023/0309197 A1 Sep. 28, 2023

(30) Foreign Application Priority Data

Mar. 22, 2022 (JP) ................................. 2022-046048

(51) Int. Cl.
*H05B 3/28* (2006.01)

(52) U.S. Cl.
CPC .................................... *H05B 3/283* (2013.01)

(58) Field of Classification Search
CPC .... H05B 3/283; H05B 2203/003; H05B 3/02; H05B 3/04; H05B 3/06; H05B 3/12; F01N 3/2026
See application file for complete search history.

(56) References Cited

U.S. PATENT DOCUMENTS

| | | | | | |
|---|---|---|---|---|---|
| 3,978,315 | A * | 8/1976 | Martin | .................... | H05B 3/265 427/125 |
| 6,677,264 | B1 * | 1/2004 | Klein | .................... | B01J 37/0246 502/79 |
| 10,314,116 | B1 * | 6/2019 | Kingman | .......... | B32B 17/10155 |
| 2011/0168692 | A1 * | 7/2011 | Assman | .................. | H05B 3/265 219/553 |
| 2011/0253337 | A1 * | 10/2011 | Matsui | .................... | H05B 3/148 164/459 |
| 2012/0121478 | A1 * | 5/2012 | Kumar | ...................... | B32B 5/26 219/528 |
| 2014/0110166 | A1 | 4/2014 | Degen et al. | | |
| 2016/0199812 | A1 * | 7/2016 | Aoki | ........................ | B01J 35/19 502/303 |
| 2016/0281570 | A1 * | 9/2016 | Mori | ..................... | F01N 3/2013 |
| 2017/0276047 | A1 * | 9/2017 | Takase | .................... | H05B 3/265 |

(Continued)

FOREIGN PATENT DOCUMENTS

| | | | |
|---|---|---|---|
| JP | 2014-520355 | A | 8/2014 |
| JP | 5748918 | B2 | 7/2015 |

(Continued)

OTHER PUBLICATIONS

Japanese Office Action (with English translation) bearing a drafting date of May 28, 2025 (Application No. 2022-046048).

*Primary Examiner* — Justin C Dodson
*Assistant Examiner* — Keith Brian Assante
(74) *Attorney, Agent, or Firm* — Muncy, Geissler, Olds & Lowe, P.C.

(57) ABSTRACT

A heater includes: a first cordierite substrate; a glass portion provided on the first cordierite substrate; and an electrically heating portion embedded in the glass portion, wherein the glass portion comprises MgO, $Al_2O_3$ and $SiO_2$.

20 Claims, 6 Drawing Sheets

(56) References Cited

U.S. PATENT DOCUMENTS

| | | | | |
|---|---|---|---|---|
| 2020/0378292 | A1 | 12/2020 | Miyairi et al. | |
| 2021/0078892 | A1 * | 3/2021 | Maehara | H05B 3/44 |
| 2021/0298127 | A1 | 9/2021 | Kawanabe et al. | |
| 2021/0298128 | A1 * | 9/2021 | Welder | F01N 3/2013 |
| 2022/0141924 | A1 * | 5/2022 | Neilson | H01B 3/10<br>219/548 |
| 2023/0328847 | A1 * | 10/2023 | Asmus | A24F 40/46<br>219/549 |

FOREIGN PATENT DOCUMENTS

| | | | |
|---|---|---|---|
| JP | 2017-182890 | A | 10/2017 |
| JP | 2020-197208 | A | 12/2020 |
| WO | 2013/073276 | A1 | 5/2013 |
| WO | 2020/090379 | A1 | 5/2020 |

* cited by examiner

HEATER AND HEATING MEMBER

CROSS REFERENCE TO RELATED APPLICATIONS

The present invention claims the benefit of priority to Japanese Patent Application No 2022-046048 filed on Mar. 22, 2022 with the Japanese Patent Office, the entire contents of which are incorporated herein by reference in its entirety.

FIELD OF THE INVENTION

The present invention relates to a heater and a heating member.

BACKGROUND OF THE INVENTION

There is an increasing demand for reduction of harmful components (HC, NOx, CO) in exhaust gases from motor vehicles. In particular, purification of NOx emitted from diesel engines is an important issue. A technology called a urea SCR system is generally known in the art as a measure for removing NOx. In the urea SCR system, thermal decomposition and hydrolysis of urea produce $NH_3$, which is a NOx reducing agent. Efficient heating of urea is required for efficient thermal decomposition and hydrolysis of urea. However, with improvement of an engine efficiency, a temperature of the exhaust gas has been decreased, and the temperature of the exhaust gas is also lower immediately after the engine is started. When the temperature of the exhaust gas is lower, the decomposition reaction does not easily occur even if the urea is injected into the exhaust gas, so that $NH_3$ is not sufficiently generated. Further, when the injected urea collides with an inner wall surface of an exhaust pipe, a lower temperature of the inner wall surface does not completely decompose the urea into $NH_3$, so that the urea will be converted to an intermediate solid deposit, which is accumulated. As a result, it will become an obstacle to the flow of the exhaust gas, or inhibit mixing of the generated $NH_3$ and the exhaust gas due to a change in the flow of the exhaust gas. Therefore, heaters have been developed that can efficiently heat the exhaust gas and maintain the inner wall surface of the exhaust pipe at a high temperature.

Further, in battery electric vehicles (BEVs) and fuel cell vehicles (FCVs) which do not have any heat source from the internal combustion engine, and plug-in hybrid vehicles (PHVs: Plug-in Hybrid Vehicle, PHEVs (Plug-in Hybrid Electrical Vehicles)) which frequently stop the internal combustion engine, an increase in a heating efficiency is an important issue because a heating load affects the traveling distance. Therefore, heaters are being developed that can efficiently heat only a specific space in a short period of time, instead of heating the entire vehicle interior.

Furthermore, to achieve carbon neutrality, the development of synthetic fuels, which are obtained by synthesizing hydrogen produced by the electrolysis of water and $CO_2$ emitted from power plants and factories, is being progressed, but heating is required for a production process of the synthetic fuel. If the production process is carried out in a place where it is possible to supply factory waste heat or like, the heat source can be easily ensured, but if it is carried out in a place where there is no heat source, it must be heated using electric power. The electric power is preferably produced from renewable energy that does not emit $CO_2$ during the production process, so that the heater is also required to have an improved heating efficiency.

A heater in which conductors are embedded in substrates with a low heat capacity or the conductor is arranged between the substrates is one of effective heating means for various applications as described above.

For example, Patent Literature 1 proposes a heater, comprising: a plate-shaped first heater substrate; a heating wire arranged in a parallel circuit on a first surface of the first heater substrate; an electrode connected to the heating wire for energizing the heating wire; and a plate-shaped cover substrate for covering the first surface of the first heater substrate, the heating wire, and the electrode on a second surface side. In this heater, the first heater substrate and/or the cover substrate contain $Si_3N_4$ or $Al_2O_3$, and the heating wire contains at least one metal selected from the group consisting of WC, TiN, TaC, ZrN, $MoSi_2$, Pt, Ru and W.

Patent Literature 2 proposes a heater, comprising: an insulating substrate made of alumina ceramics, silicon nitride ceramics, or the like; and a resistor embedded in the insulating substrate, wherein the resistor contains first conductive particles mainly based on tungsten and second conductive particles mainly based on molybdenum.

Patent Literature 3 proposes a mixer for exhaust gas purification devices, comprising: an outer cylinder made of insulating ceramics such as alumina, silicon nitride, and cordierite; fins made of insulating ceramics, which are provided inside the outer cylinder; and an electrically heating portion embedded in at least a part of the outer cylinder and/or the fins.

PRIOR ART

Patent Literatures

[Patent Literature 1] Japanese Patent Application Publication No. 2017-182890 A
[Patent Literature 2] Japanese Patent No. 5748918 B
[Patent Literature 3] Japanese Patent Application Publication No. 2020-197208 A

SUMMARY OF THE INVENTION

The present invention relates to a heater, comprising: a first cordierite substrate; a glass portion provided on the first cordierite substrate; and an electrically heating portion embedded in the glass portion, wherein the glass portion comprises MgO, $Al_2O_3$ and $SiO_2$.

Also, the present invention relates to a heating member, comprising:

a cylindrical member;
the heaters arranged along at least a part of an inner peripheral surface of the cylindrical member; and
an insulating material arranged between the cylindrical member and each of the heaters;
wherein the electrically heating portions of the heaters can be electrically connected to a power source in series or in parallel.

DETAILED DESCRIPTION OF THE INVENTION

Figure 1:
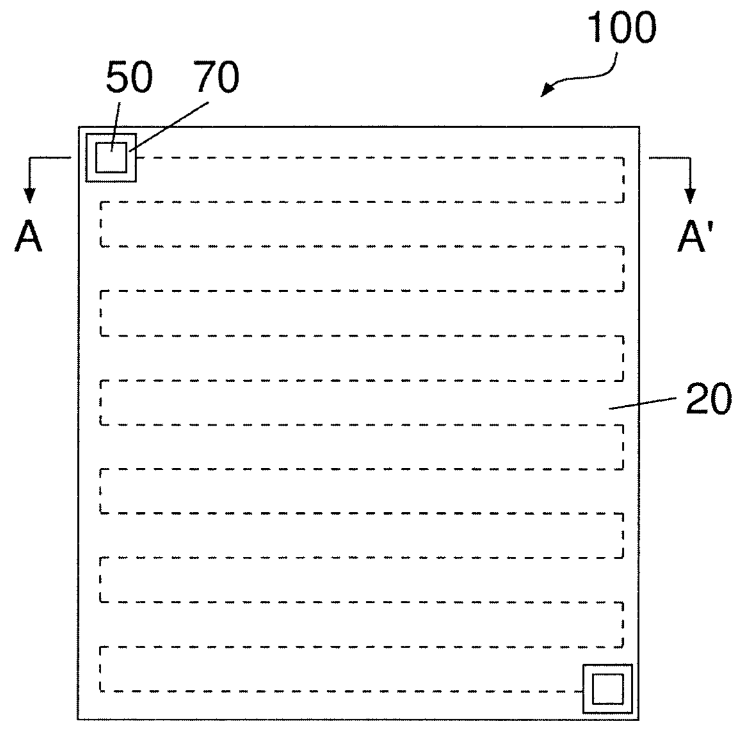
FIG. 1 is a top view of a heater according to an embodiment of the present invention.

The rapid and efficient heating capability and high reliability in an environment with large thermal fluctuations are required for the heaters used for the above applications.

In the above prior arts, the silicon nitride ($Si_3N_4$) used for the substrate of the heater is lightweight because it has a low density of about 3 g/cm$^3$. Further, the silicon nitride has a low coefficient of thermal expansion of about $3\times10^{-6}$/K and a higher Young's modulus of about 300 GPa, while it has a higher bending strength of about 800 MPa, so that it can ensure the high reliability even in the environment with large thermal fluctuations. However, the silicon nitride is expensive and requires a sintering temperature of 1700° C. or more, resulting in higher production costs.

Furthermore, the alumina ($Al_2O_3$) is an inexpensive material and representative ceramics that is widely used, but it is heavy because it has a higher density of about 4 g/cm$^3$. The alumina also has a higher coefficient of thermal expansion of about $8\times10^{-6}$/K and a higher Young's modulus of about 350 GPa. Therefore, the thermal stress is increased in the environment with large thermal fluctuations, so that it is difficult to ensure the reliability.

On the other hand, cordierite is lightweight because it has a lower density of about 2.5 g/cm$^3$. The cordierite also has a lower coefficient of thermal expansion of about $1.6\times10^{-6}$/K and a lower Young's modulus of about 150 GPa. Therefore, the cordierite can suppress the generation of thermal stress even in the environment with large thermal fluctuations, so that the high reliability can be ensured.

However, when the conductors each having a higher coefficient of thermal expansion is embedded in a cordierite substrate made of cordierite with a lower coefficient of thermal expansion or the conductor is arranged between the cordierite substrates, a difference between the coefficients of thermal expansion causes a problem that the cordierite substrate generates cracks.

The present invention is made to solve the above problems. An object of the present invention is to provide a heater and a heating member, which are difficult to generate cracks in the cordierite substrate and which have high reliability in the environment with large thermal fluctuations.

As a result of intensive studies, the present inventors have found that the embedding of an electrically heating portion (conductor) in a glass portion to provide it in the cordierite substrate can suppress the generation of cracks in the cordierite substrate, which is due to the difference between the coefficients of thermal expansion of the cordierite substrate and the electrically heating portion, and they have completed the present invention.

According to the present invention, it is possible to provide a heater and a heating member, which are difficult to generate cracks in the cordierite substrate and which have high reliability in the environment with large thermal fluctuations.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

(Heater)

Figure 2:
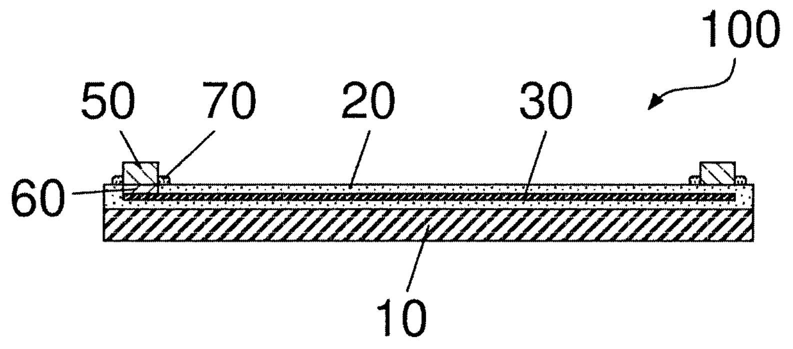
FIG. 2 is a cross-sectional view taken along the line A-A' in FIG. 1.

FIG. 1 is a top view of a heater according to an embodiment of the present invention, and FIG. 2 is a cross-sectional view of this heater taken along the line A-A' in FIG. 1.

As shown in FIGS. 1 and 2, a heater 100 includes: a first cordierite substrate 10; a glass portion 20 provided on the first cordierite substrate 10; and an electrically heating portion 30 embedded in the glass portion 20. It should be noted that in FIG. 1, the dotted line indicates the position of the electrically heating portion 30 embedded in the glass portion 20. Since the glass portion 20 has a coefficient of thermal expansion equivalent to that of the first cordierite substrate 10, the electrically heating portion 30 is embedded in the glass portion 20 and provided on the first cordierite substrate 10 so as to prevent direct contact of the cordierite substrate 10 with the electrically heating portion 30, whereby cracks in the first cordierite substrate 10 can be suppressed. Therefore, the reliability of the heater 100 can be improved in an environment with large thermal fluctuations.

The first cordierite substrate 10 is a substrate containing cordierite ($2MgO\cdot2Al_2O_3\cdot5SiO_2$) as a main component.

As used herein, the term "main component" means a component in which a percentage of the component relative to the total component is more than 50% by mass, and preferably 90% by mass or more.

The first cordierite substrate 10 is preferably comprised of 90% by mass or more of a cordierite phase, 5% by mass or less of a crystalline phase containing mullite and/or spinel, the balance being a glass phase. Such a composition can allow properties such as a coefficient of thermal expansion and Young's modulus to be controlled within desired ranges.

As used herein, the % by mass of each phase in the first cordierite substrate 10 is determined as follows. First, a plurality of samples are prepared by mixing cordierite, mullite, spinel and glass at variable mass ratios, and a calibration curve of X-ray diffraction peak values is created in advance. The peak values are determined by X-ray diffraction of the first cordierite substrate 10, and the mass ratio (% by mass) of each phase in the first cordierite substrate 10 is determined based on the calibration curve.

The first cordierite substrate 10 preferably has an open porosity of 10% or less, and more preferably 5% or less, although not particularly limited thereto. When the heater 100 is used in an environment where a liquid such as a reducing agent precursor (e.g., urea water) adheres, the control of the open porosity to that range can make it difficult for the liquid to penetrate to the interior of the first cordierite substrate 10.

Here, the open porosity of the first cordierite substrate 10 can be measured using an existing test method (Archimedes method, JIS R 1634:1998). The open porosity of the first cordierite substrate 10 can be controlled by reducing a particle size of a raw material powder or by adding a sintering aid or the like.

The first cordierite substrate 10 preferably has a coefficient of thermal expansion of $1.5\times10^{-6}$ to $2.0\times10^{-6}$/K, although not particularly limited thereto. With the coefficient of thermal expansion within such a range, thermal stress can be reduced in the environment with large thermal fluctuations, so that the reliability of the heater 100 is improved.

Here, the coefficient of thermal expansion of the first cordierite substrate 10 can be measured according to JIS R 1618: 2002.

The first cordierite substrate 10 preferably has a Young's modulus of 160 GPa or less, although not particularly limited thereto. The Young's modulus within this range can reduce the thermal stress in the environment with large thermal fluctuations, so that the reliability of the heater 100 is improved. Moreover, the Young's modulus of the first cordierite substrate 10 is preferably 100 GPa or more from the viewpoint of suppressing deformation and breakage of the heater 100 due to vibration.

Here, the Young's modulus of the first cordierite substrate 10 can be calculated as follows. The bending strength of the first cordierite substrate 10 is measured according to the four-point bending strength test method defined in JIS R 1601: 2008, and a "stress-strain curve" is created from the measurement results. A slope of the "stress-strain curve" thus obtained is calculated, and the slope of the "stress-strain curve" is defined as Young's modulus.

The glass portion 20 contains MgO, $Al_2O_3$ and $SiO_2$. Since MgO, $Al_2O_3$ and $SiO_2$ are cordierite components, the glass portion 20 containing MgO, $Al_2O_3$ and $SiO_2$ can reduce a difference between coefficients of thermal expansion of the glass portion 20 and the first cordierite substrate 10. As a result, the thermal stress can be reduced in the environment with large thermal fluctuations, so that the reliability of the heater 100 is improved. Also, adhesiveness of the glass portion 20 to the first cordierite substrate 10 can be improved.

The glass portion 20 can contain cordierite ($2MgO\cdot2Al_2O_3\cdot5SiO_2$). By containing the cordierite in the glass portion 20, the coefficient of thermal expansion of the glass portion 20 can be close to the coefficient of thermal expansion of the first cordierite substrate 10. As a result, the thermal stress can be reduced in the environment with large thermal fluctuations, so that the reliability of the heater 100 is improved. Also, the adhesiveness of the glass portion 20 to the first cordierite substrate 10 can be improved.

Although a method of containing the cordierite in the glass portion 20 is not particularly limited, for example, waste materials generated during the production of the first cordierite substrate 10 may be added to the raw material of the glass portion 20.

The glass portion 20 is preferably comprised of 30 to 40% by mass of a cordierite phase, and 2% by mass or less of a crystalline phase containing mullite and/or spinel, the balance being a glass phase. Such a composition can allow properties such as the coefficient of thermal expansion to be controlled within the desired range.

Here, the % by mass of each phase in the glass portion 20 is determined as follows. First, a plurality of samples are prepared by mixing cordierite, mullite, spinel and glass at variable mass ratios, and a calibration curve of X-ray diffraction peak values is prepared in advance. The peak values are then determined by X-ray diffraction of the glass portion 20, and the mass ratio (% by mass) of each phase in the glass portion 20 is determined based on the calibration curve.

The glass portion 20 preferably has a coefficient of thermal expansion of more than $1.6\times10^{-6}$/K and less than $3.0\times10^{-6}$/K, and more preferably more than $1.6\times10^{-6}$/K and $2.5\times10^{-6}$/K or less, and even more preferably more than $1.6\times10^{-6}$/K and $2.0\times10^{-6}$/K, although not particularly limited thereto. The coefficient of thermal expansion of the glass portion 20 within the above range can reduce the difference between the coefficients of thermal expansion of the glass portion 20 and the first cordierite substrate 10. As a result, the thermal stress can be reduced in the environment with large thermal fluctuations, so that the reliability of the heater 100 is improved.

The electrically heating portion 30 is comprised of a conductor that generates heat by energization. The conductor is not particularly limited, and metals or alloys known in the art may be used. Among them, the conductor preferably contains Mo and/or W. The use of such a conductor can reduce the difference between the coefficients of thermal expansion of the electrically heating portion 30 and the glass portion 20 and also improve the compatibility with the glass portion 20 in which the conductor is embedded. Other usable conductors include Ni—Cr alloys and Fe—Cr—Al alloys.

The electrically heating portion 30 preferably has a coefficient of thermal expansion of more than $1.6\times10^{-6}$/K and less than $6.0\times10^{-6}$/K, and more preferably more than $1.6\times10^{-6}$/K and $5.5\times10^{-6}$/K or less, although not particularly limited thereto. The coefficient of thermal expansion of the electrically heating portion 30 within the above range can reduce the difference between the coefficients of thermal expansion of the electrically heating portion 30 and the glass portion 20. As a result, the thermal stress can be reduced in the environment with large thermal fluctuations, so that the reliability of the heater 100 is improved. For example, Mo has a coefficient of thermal expansion of about $5.0\times10^{-6}$/K. Further, the coefficient of thermal expansion of the electrically heating portion 30 can be controlled by adjusting the ratio and type of each component using a conductive composite obtained by combining Mo powder and/or W powder and glass powder having lower thermal expansion.

The shape of the electrically heating portion 30 is not particularly limited, and it may be various shapes such as a linear shape, a plate shape, and a sheet shape. FIGS. 1 and 2 show an example where a linear electrically heating portion 30 is formed.

A second cordierite substrate can be further provided on the glass portion 20 in which the electrically heating portion 30 is embedded.

Figure 3:
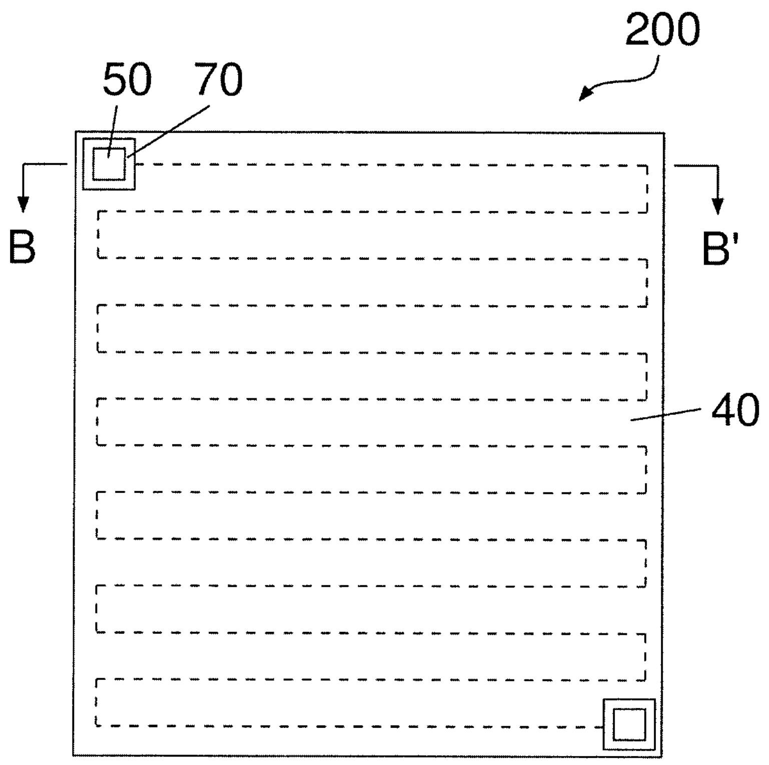
FIG. 3 is a top view of a heater according to other embodiment of the present invention.
Figure 4:
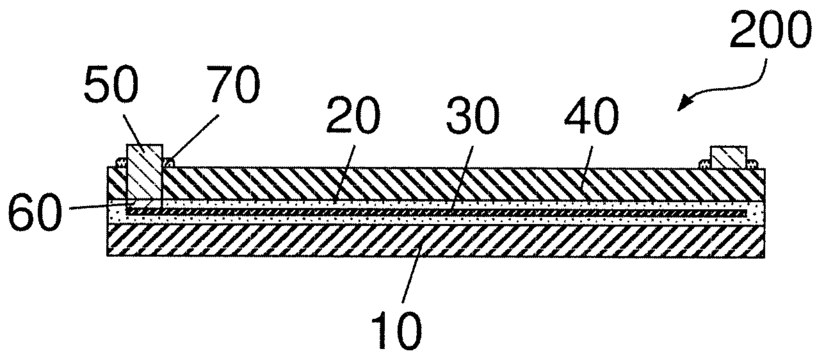
FIG. 4 is a cross-sectional view taken along the line B-B' in FIG. 3.

Here, FIG. 3 shows a top view of a heater further including a second cordierite substrate, and FIG. 4 shows a cross-sectional view of the heater taken along the line B-B'.

As shown in FIGS. 3 and 4, a heater 200 includes: a first cordierite substrate 10; a glass portion 20 provided on the first cordierite substrate 10; an electrically heating portion 30 embedded in the glass portion 20; and a second cordierite substrate 40 provided on the glass portion 20. It should be noted that in FIG. 3, the dotted line indicates the position of the electrically heating portion 30 embedded in the glass portion 20. In the heater 200 having such a structure, the electrically heating portion 30 is embedded in the glass portion 20 and provided between the first cordierite substrate 10 and the second cordierite substrate 40 so that the first cordierite substrate 10 and the second cordierite substrate 40 are not in direct contact with the electrically heating portion 30. Therefore, the cracking of the first cordierite substrate 10 and the second cordierite substrate 40 can be suppressed. Accordingly, the reliability of the heater 200 can be improved in the environment with large thermal fluctuations.

The second cordierite substrate 40 is a substrate containing cordierite ($2MgO \cdot 2Al_2O_3 \cdot 5SiO_2$) as a main component, as with the first cordierite substrate 10, and the same substrate as the first cordierite substrate 10 may be used.

The second cordierite substrate 40 is preferably comprised of 90% by mass or more of a cordierite phase, and 5% by mass or less of a crystalline phase containing mullite and/or spinel, the balance being a glass phase. With such a composition, properties such as the coefficient of thermal expansion and Young's modulus can be controlled within desired ranges. The % by mass of each phase in the second cordierite substrate 40 can be obtained in the same manner as that of the % by mass of each phase in the first cordierite substrate 10.

The heater 100, 200 may further include terminals 50 each connected to the electrically heating portion 30 via a brazing material 60, as shown in FIGS. 1 to 4. Such a structure makes it easy to electrically connect the electrically heating portion 30 to an external power source (not shown).

The terminal 50 is comprised of a conductor capable of energization. The conductor used for the terminal 50 is not particularly limited, and metals or alloys known in the art may be used. Among them, the conductor used for the terminal 50 preferably contains Fe, Ni and Co. As such a material, Kovar can be used, for example.

It should be noted that the conductor used for the terminal 50 may be comprised of the same conductor as the electrically heating portion 30, or may be comprised of a conductor different from that of the electrically heating portion 30.

The conductor making up the terminal 50 preferably has a coefficient of thermal expansion of more than $1.6 \times 10^{-6}$/K and less than $6.0 \times 10^{-6}$/K, and more preferably more than $3.0 \times 10^{-6}$/K and less than $6.0 \times 10^{-6}$/K or less, although not particularly limited thereto. The coefficient of thermal expansion of the conductor making up the terminal within the above range can reduce the difference between the coefficients of thermal expansion of the second cordierite substrate 40 and the conductor making up the terminal 50 in the heater 200 as shown in FIGS. 3 and 4. As a result, the thermal stress can be reduced in the environment with large thermal fluctuations, so that the reliability of the heater 200 is improved. For example, Kovar has a coefficient of thermal expansion of about $5.0 \times 10^{-6}$/K.

In heater 200 as shown in FIGS. 3 and 4, each terminal 50 is preferably inserted into a through-hole provided in second cordierite substrate 40. Such a structure makes it easy to electrically connect the electrically heating portion 30 to the external power source (not shown).

The brazing material 60 is a material for joining the electrically heating portion 30 to the terminal 50. The brazing material 60 is not particularly limited, and an appropriate material may be selected depending on types of the electrically heating portion 30 and the terminals 50. For example, when the conductor containing Mo and/or W is used for the electrically heating portion 30 and a conductor containing Fe, Ni and Co is used for the terminal 50, the brazing material 60 preferably contains Ag, Ti and Cu. If the brazing material 60 contains such components, the electrically heating portion 30 and the terminals 50 can be appropriately joined without affecting them.

Here, using a conductor (Mo wire) made of Mo for the electrically heating portion 30, and using a conductor (Kovar pin) made of Kovar for the terminal 50, experiments were conducted to actually join the electrically heating portion 30 and the terminal 50 together by three brazing materials 60 (66Ag-8Ti-Cu, 65Ag-15Pd-Cu, and Ni—Cr—P). As a result, 66Ag-8Ti-Cu could satisfactorily join the Mo wire and the Kovar pin together at about 900° C. On the other hand, for 65Ag-15Pd-Cu, evaporation of Pd was confirmed when the Mo wire and the Kovar pin were joined together at 900° C. Also, for Ni—Cr—P, reaction with the Mo wire was confirmed. Therefore, it can be said that 66Ag-8Ti-Cu is the most suitable brazing material 60 when the Mo wire is used for the electrically heating portion 30 and the Kovar pin is used for the terminal 50.

The heater 100, 200 may further include a sealing portion 70 provided at a boundary surface between the terminal 50 and the glass portion 20 or the second cordierite substrate 40, as shown in FIGS. 1 to 4. More particularly, the heater 100 can be provided with the sealing portion 70 at the boundary surface between the terminal 50 and the glass portion 20. Also, the heater 200 can be provided with a sealing portion 70 on the boundary surface between the terminal 50 and the second cordierite substrate 40. Such a structure can suppress intrusion of liquid, air or the like from the boundary, so that the reliability of the heater 100, 200 can be improved.

A material for forming the sealing portion 70 is not particularly limited, and known sealing materials in the art may be used. Among them, the material forming the sealing portion 70 is preferably glass.

Also, the sealing portion 70 (glass) preferably contains $SiO_2$ and $B_2O_3$. Since the sealing portion 70 containing such components has a lower coefficient of thermal expansion, the cracks in the sealing portion 70 and members around it (the glass portion 20 and the second cordierite substrate 40) can be suppressed.

The glass making up the sealing portion 70 preferably has a coefficient of thermal expansion of more than $1.6 \times 10^{-6}$/K and less than $6.0 \times 10^{-6}$/K, and more preferably more than $2.0 \times 10^{-6}$/K and less than $4.0 \times 10^{-6}$/K, although not particularly limited thereto. The coefficient of thermal expansion of the glass making up the sealing portion 70 within the range as described above reduces the difference between the coefficients of the thermal expansion of the glass portion 20, and the conductor making up the terminal 50 and the glass making up the sealing portion 70 for the heater 100, and reduces the difference between the coefficients of thermal expansion of the second cordierite substrate 40, and the conductor making up the terminal 50 and the glass making up the sealing portion 70. As a result, the thermal stress in the environment with large thermal fluctuations can be reduced, so that the reliability of the heater 100, 200 can be improved.

The heaters 100, 200 having the structures as described above can be used for various applications, because they are difficult to generate cracks in the cordierite substrates (the first cordierite substrate 10 and the second cordierite substrate 40), and have high reliability in the environment with large thermal fluctuations.

For example, the heaters 100, 200 are useful for heating an exhaust gas in an exhaust gas mixer that mixes urea and the exhaust gas in a diesel engine urea SCR system. In the urea SCR system, the heaters 100, 200 are also useful for maintaining a high temperature of the inner wall surface of the cylindrical member (exhaust pipe) that forms the exhaust gas mixer, and preventing the urea from becoming an intermediate solid deposit to be accumulated when the urea collides with the inner wall surface. In the urea SCR system, ammonia ($NH_3$) that will be used as a NOx reducing agent can be produced by injecting urea water into the exhaust gas heated by the heaters 100, 200.

Each of the heaters 100, 200 is also useful as heating equipment for electric vehicles, fuel cell vehicles, and plug-in hybrid vehicles, and as a heating means for the production process of the synthetic fuel.

The heaters 100, 200 can be produced according to methods known in the art.

For example, the heater 100 can be produced as follows:

First, a forming material containing cordierite raw material powder is formed and then sintered to produce the first cordierite substrate 10. Although the forming method is not particularly limited, extrusion molding, mold cast molding, or the like may be used. Alternatively, the first cordierite substrate 10 may be produced by machining a sintered body having a predetermined shape.

The electrically heating portion 30 is then sandwiched between two glass sheets that will form the glass portion 20, and arranged on the first cordierite substrate 10 to form a stacked structure. At this time, the glass sheet on the surface side is provided with an opening for connecting the electrically heating portion 30 to each terminal 50 with the brazing material 60.

The stacked structure is then integrated by a heating and pressing process. At this time, the glass sheets are integrated to form the glass portion 20, and the electrically heating portion 30 is embedded in the glass portion 20. Although the heating and pressing conditions are not particularly limited, they may be appropriately set according to the type of the glass sheets to be used.

Each terminal 50 is then placed on the electrically heating portion 30 exposed in the opening of the glass sheet on the surface side via the brazing material 60, and then heated and joined. Although the heating conditions are not particularly limited, they may be appropriately set according to the type of the brazing material 60 to be used.

Finally, the sealing material is applied to the boundary between each terminal 50 and the glass portion 20 on the surface of the glass portion 20, and then heated to form the sealing portion 70, thereby completing the heater 100. Although the heating conditions are not particularly limited, they may be appropriately set according to the type of the sealing material to be used.

The heater 200 can be produced as follows:

First, forming materials each containing cordierite raw material powder are formed and then sintered to produce the first cordierite substrate 10 and the second cordierite substrate 40.

The electrically heating portion 30 is then sandwiched between two glass sheets that will form the glass portion 20, and this is placed between the first cordierite substrate 10 and the second cordierite substrate 40 to form a stacked structure. At this time, the second cordierite substrate 40 and the glass sheet on the second cordierite substrate 40 side are provided with an opening for connecting the electrically heating portion 30 to each terminal 50 with the brazing material 60.

The stacked structure is then integrated by heating the stacked structure while pressing it in order to improve the adhesiveness among the first cordierite substrate 10, the second cordierite substrate 40, and the glass sheets sandwiching the electrically heating portion 30.

Each terminal 50 is placed on the electrically heating portion 30 exposed in the opening of the second cordierite substrate 40 and the glass sheet on the second cordierite substrate 40 side via the brazing material 60, and then heated and joined.

Finally, the sealing material is applied to the boundary between each terminal 50 and the second cordierite substrate 40 on the surface of the second cordierite substrate 40, and then heated to form the sealing portion 70, thereby completing the heater 200.

(2) Heating Member

Figure 5:
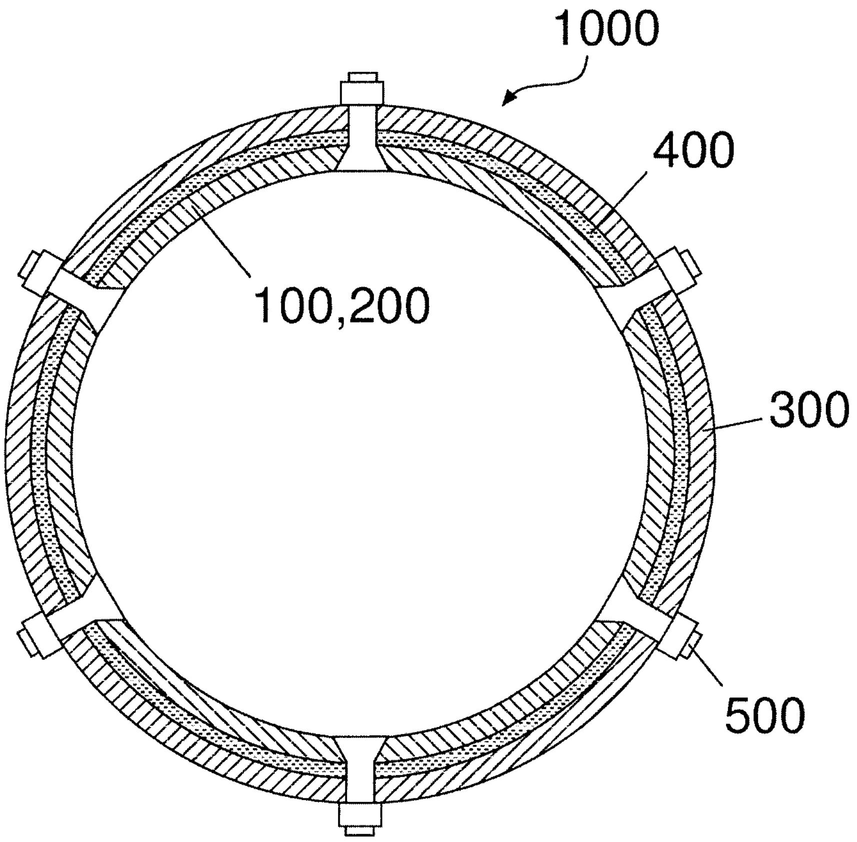
FIG. 5 is a cross-sectional view of a heating member according to an embodiment of the invention.

FIG. 5 is a cross-sectional view of a heating member according to an embodiment of the present invention. It should be noted that FIG. 5 is a cross-sectional view of a cylindrical member 300 forming a heating member 1000 in a direction perpendicular to an axial direction.

As shown in FIG. 5, the heating member 1000 includes: a cylindrical member 300; a plurality of the heaters 100, 200 arranged along at least a part of an inner peripheral surface of the cylindrical member 300; and an insulating material 400 disposed between the cylindrical member 300 and the heaters 100, 200. Such a structure can allow the interior of the cylindrical member 300 to be heated.

The cylindrical member 300 is not particularly limited, and it may have a uniform diameter in the axial direction, or may have a decreased and/or increased diameter in the axial direction.

Although the material of the cylindrical member 300 is not particularly limited, it is preferably a metal from the viewpoint of manufacturability. Examples of the metal that can be used herein include stainless steel, titanium alloys, copper alloys, aluminum alloys, and brass. Among them, the stainless steel is preferable because of its high durability and reliability and low cost.

The cylindrical member 300 preferably has a thickness of 0.1 mm or more, and more preferably 0.3 mm or more, and even more preferably 0.5 mm or more, although not particularly limited thereto. The thickness of the cylindrical member 300 of 0.1 mm or more can ensure durability and reliability. Also, the thickness of the cylindrical member 300 is preferably 10 mm or less, and more preferably 5 mm or less, and even more preferably 3 mm or less. The thickness of the cylindrical member 300 of 10 mm or less can achieve weight reduction.

The insulating material 400 is not particularly limited, and a fiber mat made of silicon nitride, alumina, or the like may be used.

A thickness of the insulating material 400 is not particularly limited as long as it can ensure insulation.

The plurality of the heaters 100, 200 are arranged along at least a part of the inner peripheral surface of cylindrical member 300. Although a method for fixing the heaters 100, 200, for example, they may be fixed to the inner peripheral surface of the cylindrical member 300 using fixing jigs such as bolts 500.

The plurality of heaters 100, 200 are configured such that the electrically heating portions 30 can be electrically connected to a power source in series or in parallel. Such a configuration can cause the plurality of the heaters 100, 200 to generate heat by applying a voltage from the power source, and allow the interior of the cylindrical member 300 to be heated.

Figure 6:
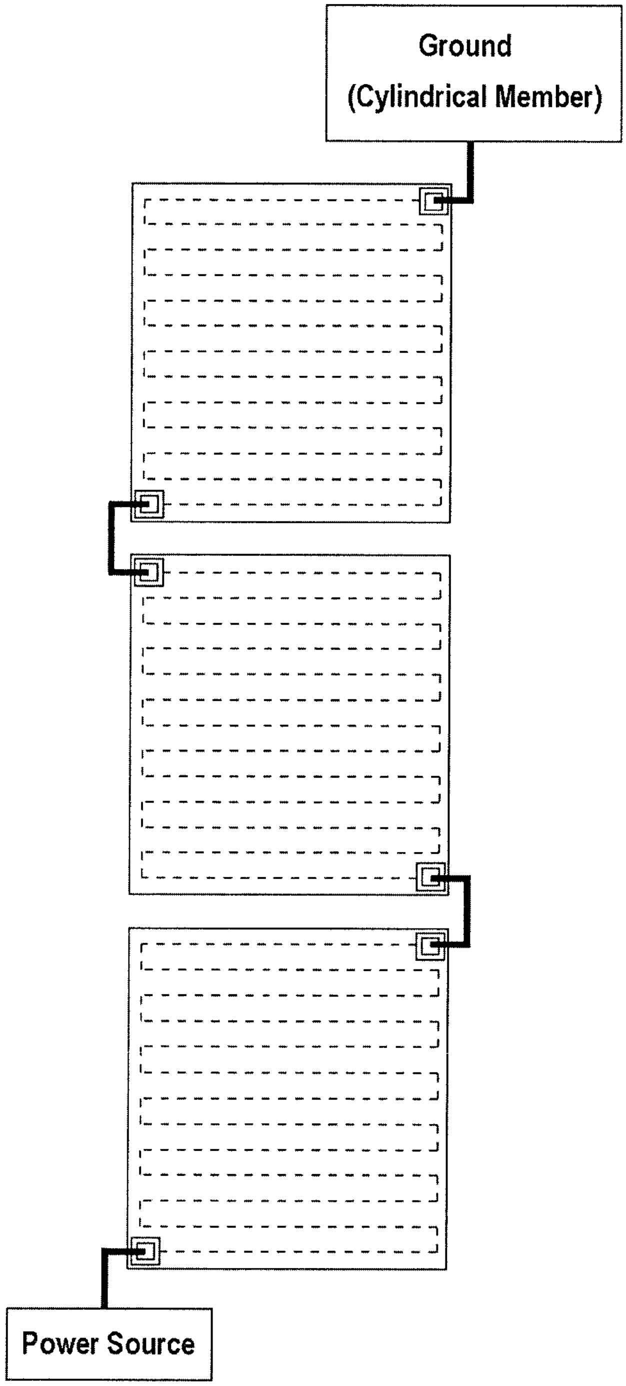
FIG. 6 is a top view showing a state where electrically heating portions of a plurality of heaters according to an embodiment of the present invention are electrically connected to a power source in series.
Figure 7:
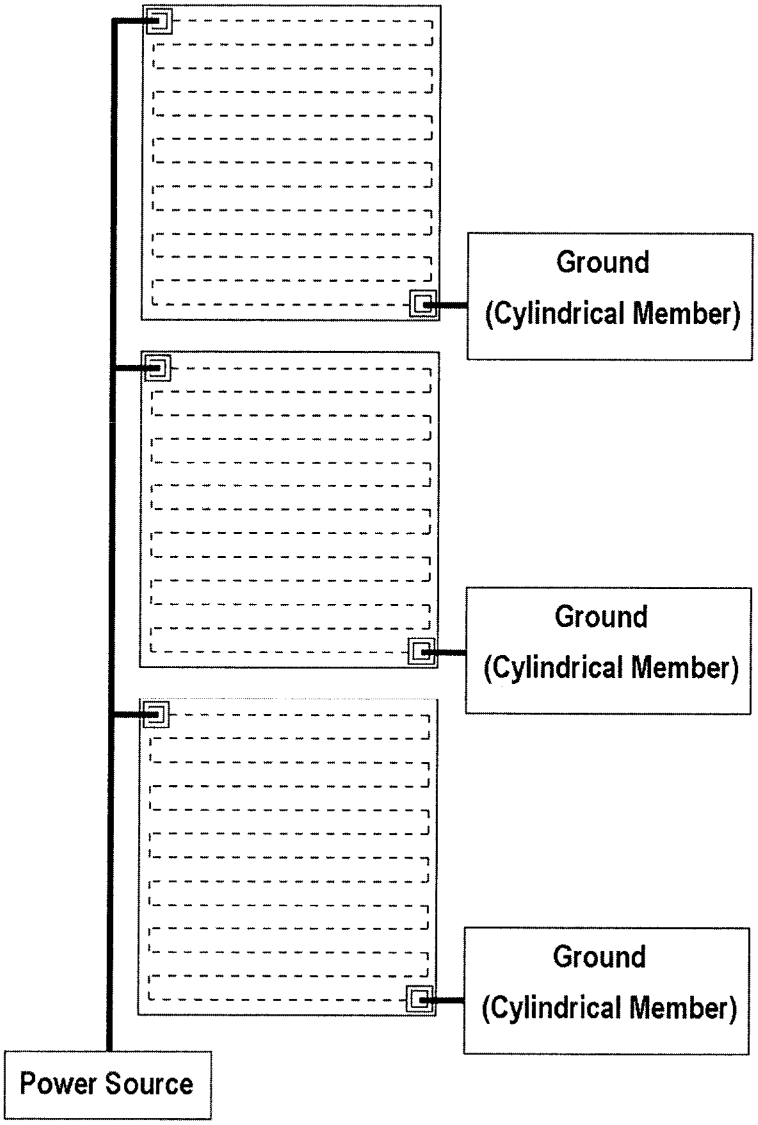
FIG. 7 is a top view showing a state where electrically heating portions of a plurality of heaters according to an embodiment of the present invention are electrically connected to a power source in parallel.

Here, FIG. 6 shows a top view showing a state where the electrically heating portions 30 of the plurality of the heaters 100, 200 are electrically connected to the power source in series. Also, FIG. 7 shows a top view of a state where the electrically heating portions 30 of the plurality of the heaters 100, 200 are electrically connected to the power source in parallel. It should be noted that FIGS. 6 and 7 show the three heaters 100 as a plane view in terms of easy understanding. The dotted lines indicate the positions of the embedded electrically heating portions 30.

In FIG. 6, the electrically heating portions 30 of the plurality of the heaters 100, 200 are electrically connected in series, one end of the electrically heating portions 30 connected in series is electrically connected to the power source, and the other end is electrically connected to a ground (for example, the cylindrical member 300). In FIG. 7, the electrically heating portions 30 of the plurality of the heaters 100, 200 are electrically connected in parallel, one end of each electrically heating portion 30 is electrically connected to the power source, and the other end is electrically connected to a ground (for example, the cylindrical member 300).

Although the voltage applied from the power source is not particularly limited, it is preferably 60 V or less. The voltage in this range do not require special insulation. Further, the applied voltage is preferably 12 V or more, in view of the heating efficiency of the heater 100, 200.

The heating member according to the embodiment of the present invention is suitable for use in the diesel engine urea SCR system. That is, the heating member according to the embodiment of the present invention can be used to maintain a higher temperature of the inner wall surface of the cylindrical member 300 that forms the exhaust gas mixer for mixing a reducing agent precursor (e.g., urea water) with the exhaust gas, and heat the reducing agent precursor to generate a reducing agent (e.g., ammonia) while preventing the urea from becoming an intermediate solid deposit to be accumulated when the urea collides with the inner wall surface.

Figure 8:
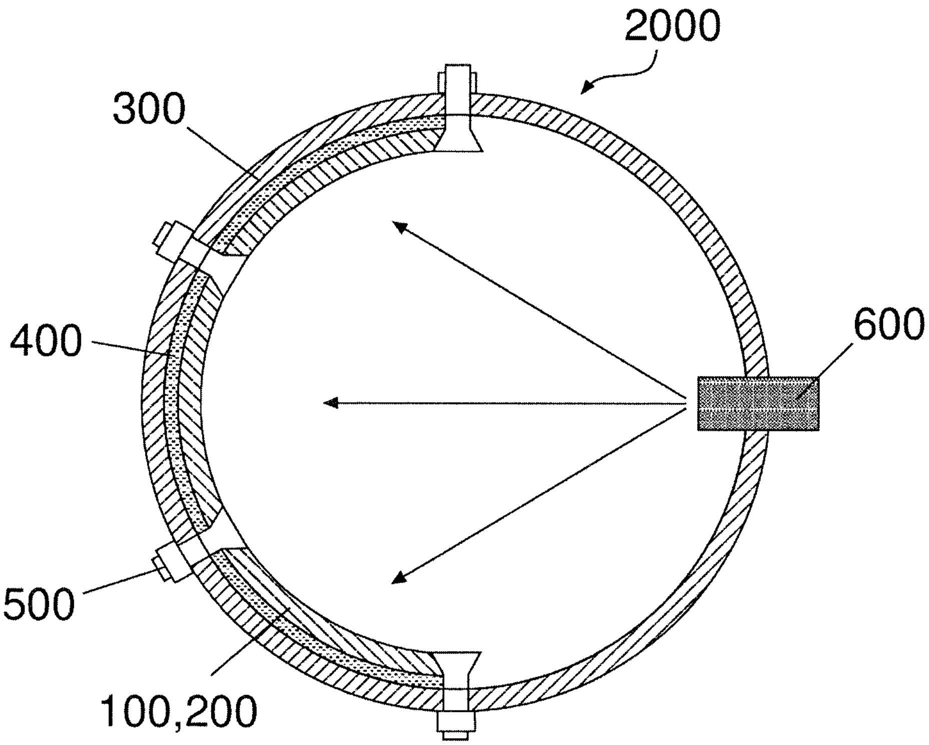
FIG. 8 is a cross-sectional view of a heating member according to an embodiment of the invention used for heating a reducing agent precursor to generate a reducing agent.

FIG. 8 shows a cross-sectional view of a heating member used for heating the reducing agent precursor to generate the reducing agent. It should be noted that FIG. 8 is a cross-sectional view of a cylindrical member 300 forming a heating member 2000 in a direction perpendicular to the axial direction.

As shown in FIG. 8, the heating member 2000 is arranged on at least part of the cylindrical member 300 and further includes a nozzle 600 capable of injecting the reducing agent precursor onto the inner peripheral surface of the cylindrical member 300. Also, the plurality of the heaters 100, 200 are arranged on the inner peripheral surface of the cylindrical member 300 onto which the reducing agent precursor is injected from the nozzle 600. Furthermore, the cylindrical member 300 is an exhaust pipe of a diesel engine. Such a structure can allow the exhaust gas flowing through the cylindrical member 300 (exhaust pipe) to be heated by the plurality of the heaters 100, 200, so that the reducing agent precursor can be injected into the heated exhaust gas to generate the reducing agent. Further, even if the reducing agent precursor injected from the nozzle 600 collides with the plurality of the heaters 100, 200, the reducing agent precursor evaporates immediately, so that the accumulation of the deposits produced by decomposition of the reducing agent precursor can also be suppressed.

The heating member 2000 is preferably configured such that electrically heating portions 30 of the plurality of the heaters 100, 200 are electrically connected in parallel. That is, it is preferable that one end of the electric heating portions 30 of the plurality of the heaters 100, 200 are electrically connected to the power source and the other end is electrically connected to the ground (for example, the cylindrical member 300). Also, a voltage applied from the power source is preferably 60 V or less. Such a configuration can allow the reducing agent precursor to be rapidly and efficiently heated to generate the reducing agent, and allow the deposition of the intermediate onto the inner wall surface of the cylindrical member 300 to be suppressed.

DESCRIPTION OF REFERENCE NUMERALS

10 first cordierite substrate
20 glass portion
30 electrically heating portion
40 second cordierite substrate
50 terminal
60 brazing material
70 sealing portion
100, 200 heater
300 cylindrical member
400 insulating material
500 bolt
600 nozzle
1000, 2000 heating member

The invention claimed is:

1. A heater, comprising: a first cordierite substrate; a glass portion provided on the first cordierite substrate; and an electrically heating portion embedded in the glass portion,
wherein the glass portion comprises MgO, $Al_2O_3$ and $SiO_2$, and
wherein the glass portion has a coefficient of thermal expansion of more than $1.6\times10^{-6}$/K and less than $3.0\times10^{-6}$/K.

2. The heater according to claim 1, further comprising a second cordierite substrate provided on the glass portion.

3. The heater according to claim 1, further comprising terminals each connected to the electrically heating portion by a brazing material.

4. The heater according to claim 3, wherein each of the terminals is inserted into a through-hole provided in the second cordierite substrate.

5. The heater according to claim 3, further comprising a sealing portion provided on a boundary surface between each of the terminals and the glass portion or the second cordierite substrate.

6. The heater according to claim 1, wherein the glass portion comprises cordierite.

7. The heater according to claim 1, wherein the glass portion is made of 30 to 40% by mass of a cordierite phase, and 2% by mass or less of a crystalline phase containing mullite and/or spinel, the balance being a glass phase.

8. The heater according to claim 1, wherein the first cordierite substrate and/or a second cordierite substrate are/is made of 90% by mass or more of a cordierite phase, and 5% by mass or less of a crystalline phase containing mullite and/or spinel, the balance being a glass phase.

9. The heater according to claim 1, wherein the electrically heating portion is made of a conductor comprising Mo and/or W.

10. The heater according to claim 3, wherein each of the terminals is made of a conductor having a coefficient of thermal expansion of more than $1.6\times10^{-6}$/K and less than $6.0\times10^{-6}$/K.

11. The heater according to claim 10, wherein the conductor making up each of the terminals has a thermal expansion coefficient of more than $3.0\times10^{-6}$/K and less than $6.0\times10^{-6}$/K.

12. The heater according to claim 5, wherein the sealing portion is made of glass having a coefficient of thermal expansion of more than $1.6\times10^{-6}$/K and less than $6.0\times10^{-6}$/K.

13. The heater according to claim 12, wherein the glass making up the sealing portion has a coefficient of thermal expansion of more than $2.0\times10^{-6}$/K and less than $4.0\times10^{-6}$/K.

14. The heater according to claim 3, wherein each of the terminals comprises Fe, Ni and Co.

15. The heater according to claim 5, wherein the sealing portion comprises $SiO_2$ and $B_2O_3$.

16. The heater according to claim 3, wherein the brazing material comprises Ag, Ti and Cu.

17. The heater according to claim 1, wherein the heater is used for heating an exhaust gas.

18. A heating member, comprising:

a cylindrical member;

the heaters according to claim 1 arranged along at least a part of an inner peripheral surface of the cylindrical member; and an insulating material arranged between the cylindrical member and each of the heaters;

wherein the electrically heating portions of the heaters can be electrically connected to a power source in series or in parallel.

19. The heating member according to claim 18 used for heating a reducing agent precursor to generate a reducing agent, wherein the heating member further comprises a nozzle capable of injecting the reducing agent precursor, the nozzle being arranged on at least a part of the cylindrical member, wherein each of the heaters is arranged on an inner peripheral surface of the cylindrical member onto which the reducing agent precursor is injected from the nozzle, and wherein the cylindrical member is an exhaust pipe of a diesel engine.

20. The heating member according to claim 19, wherein the electrically heating portions of the heaters have one end electrically connected to the power source and the other end electrically connected to the cylindrical member, and wherein a voltage applied from the power source is 60 V or less.

* * * * *